C. Angle,
Animal Trap.
No. 104,684. Patented June 28. 1870.

Witnesses.
Chas. O. Simonds
Chas. T. Saxton

Inventor.
Charles Angle
By Edward Taggart
his Attorney

United States Patent Office.

CHARLES ANGLE, OF HAZEL GREEN, MICHIGAN.

Letters Patent No. 104,684, dated June 28, 1870.

IMPROVED ANIMAL TRAP.

The Schedule referred to in these Letters Patent and making part of the same.

*To all whom it may concern:*

Be it known that I, CHARLES ANGLE, of Hazel Green, Shiawassee county, Michigan, have invented certain new and useful Improvements in Animal Traps; and I do hereby declare that the following is a full, clear, and exact description of my invention, reference being had to the accompanying drawing and the letters of reference marked thereon, and the same is made a part of this specification.

In the drawing—

To enable others who are skilled in the branch of mechanics to which the manufacture of my invention belongs to make the same, I will proceed to describe its construction.

Figure 1:
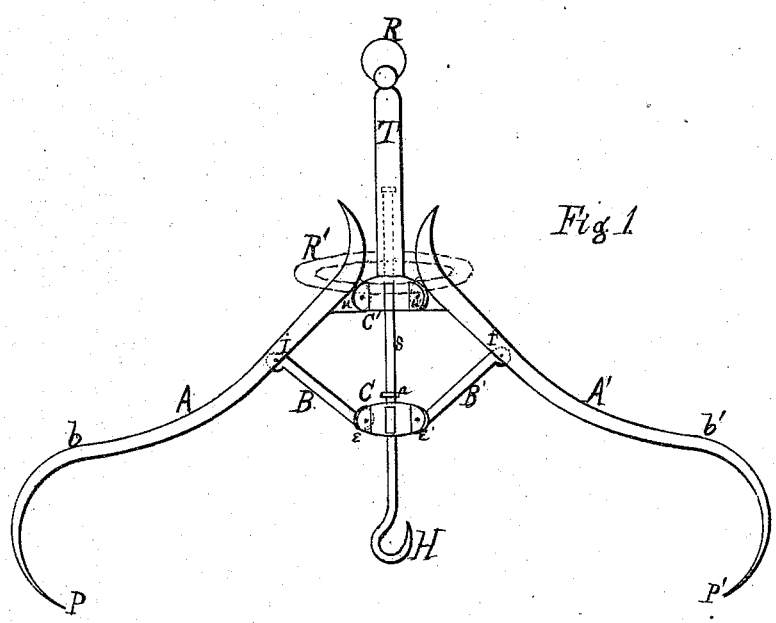
Figure 1 is a general view of my invention in perspective, with only two arms, A and A'.

In fig. 1, C' represents a collar immovably attached to the lower end of the cylindrical tube T.

Figure 2:
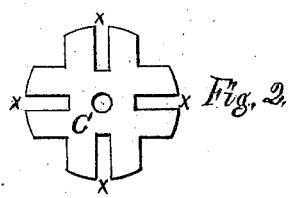
Figure 2 is a top view of the movable collar C, showing the slots into which are fitted the braces B B', &c.

The collar C' is constructed in precisely the same shape and form as the collar C shown in fig. 2, and provided with slots, as shown in fig. 2 by $x \, x \, x \, x$.

A A' are arms provided with projections fitting into the slots in the collar C', and turning upon the pivots $u$ and $u'$.

B is an arm or brace, one end of which fits into a slot in the collar C, and turns upon a pivot, $e$, and the other end fitting into a slot provided in the arm A, and turning upon the pivot $i$.

B' is a brace or arm fitting into the collar C and arm A', turning upon the pivots $i'$ and $e'$.

S is a rod, provided with the hook H and immovable collar $a$. This collar may be so constructed as to be adjusted upon the rod S in any place desired.

The rod S is intended to slide upward through the collar C' into the tube T, when the trap is being operated.

R is a ring attached to the top of the tube T, for convenience in using the trap.

The arms A A' are bent outwardly, as shown in the figure by $b \, b'$, and again bent inwardly and provided with sharp points, as shown in the figure by $p \, p'$.

R' is a heavy metallic ring, which rests upon the upper ends of the arms when the arms are raised or opened, and slides down upon the arms when they are down or closed.

In my invention I deem four arms the requisite number, but a greater or lesser number may be used if desired, and the arms may be each provided with one or more points, if it is desirable in any case to do so.

In using my invention the trap is attached, by means of the ring R, to some suitable object, in such a manner that the trap will hang free and clear from the ground. The bait is attached to the hook H, and the collar C is then pressed upward, the braces B and B' raising the arms A and A' until the collar C and the inner ends of the braces B B' are a trifle higher than the outer ends of these braces. The rod S being now pressed up into the cylindrical tube T, the collar $a$ rests against the collar C', and the collar C against the collar $a$. The arms A and A', by their weight, now hold the collar C in the position described, and the trap is set. The animal, seeking the bait, pulls downward upon the hook H, and the collar C, being drawn below a horizontal line drawn from $i$ to $i'$, the arms quickly descend, the hooked points clasping the neck of the animal, and the ring R', at the same time sliding down upon the arms, holds them firmly upon the victim until the ring is removed by the trapper.

The collar C or the ring R' may be forced downward by means of a spring, if desired, but in ordinary traps I deem the device above described cheaper, simpler, and equally effective.

Having thus described my invention,

What I claim to have invented, and desire to secure by Letters Patent, is—

1. The combination of the arms A A', collars C and C', braces B and B', collar $a$, cylindrical tube T, and rod S, provided with the hook H, all constructed and arranged to operate as herein described, and for the purpose specified.

2. In combination with the above, the ring R', for the purpose specified.

In witness that I claim the above, I have hereunto subscribed my name this 19th day of May, 1870.

CHARLES ANGLE.

Witnesses:
CHARLES O. LAPHAM,
SAMUEL SHUSTEN,
PETER HENDRICK,
THOMAS CARMODY.